United States Patent [19]

Kosaka et al.

[11] Patent Number: 4,633,261
[45] Date of Patent: Dec. 30, 1986

[54] METHOD AND APPARATUS FOR CORRELATING TARGET TRACK DATA

[75] Inventors: Michitaka Kosaka, Sagamihara; Shoji Miyamoto, Kawasaki, both of Japan

[73] Assignee: Hitachi, Ltd., Tokyo, Japan

[21] Appl. No.: 540,352

[22] Filed: Oct. 11, 1983

[30] Foreign Application Priority Data

Oct. 8, 1982 [JP] Japan .................. 57-176144

[51] Int. Cl.[4] .............. G01S 5/02; G01S 13/00; G01S 15/00
[52] U.S. Cl. .................. 342/430; 364/517; 342/189
[58] Field of Search .......... 343/430, 456, 5 DP, 343/463, 7 A, 465, 5 VQ, 378; 364/517, 516, 429, 439, 456

[56] References Cited
U.S. PATENT DOCUMENTS 4,025,920  5/1977  Reitboeck et al. .............. 343/5 DP
4,136,340  1/1979  Bishop ........................ 343/5 VQ

OTHER PUBLICATIONS

S. Gilon and A. N. Venetsanopoulos, Design of MTI Radar on the Basis of Detection Probability, IEEE Trans. on A. and E. Systems, Jan. 1979.

Primary Examiner—Theodore M. Blum
Assistant Examiner—Gregory C. Issing
Attorney, Agent, or Firm—Antonelli, Terry & Wands

[57] ABSTRACT

A target track data correlating decision in a multisensor system which decides whether the tracking data and observation data sent from a plurality of sensor sites are ones on the same target or different targets on the basis of the data. The correlation decision is implemented in a method and apparatus in such a manner that the likelihood ratios of parameters of the target track data are calculated and compared to decide whether the target is the same or not in accordance with a density distribution of each parameter of the data.

7 Claims, 9 Drawing Figures

METHOD AND APPARATUS FOR CORRELATING TARGET TRACK DATA

BACKGROUND OF THE INVENTION

1. Field of the Invention

This invention relates to a method and an apparatus for correlating target track data by which a decision is made as to whether or not a plurality of target track data are correlated with each other.

2. Description of the Prior Art

A multisensor system such as a radar surveillance system for air traffic control and the like requires a target track data correlation processing by which a decision is made as to whether or not tracking data transmitted from plural sensor sites are data on the same target.

Figure 1:
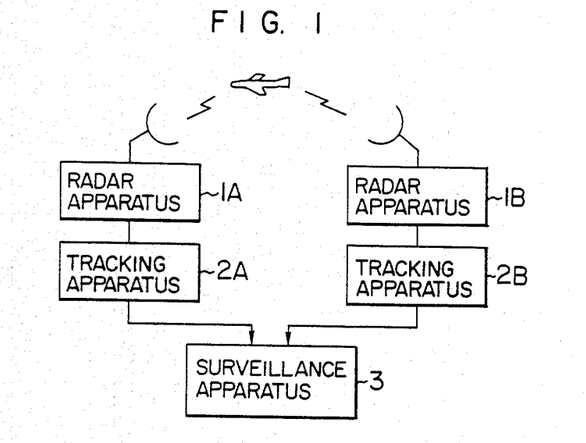
FIG. 1 shows a schematic diagram of a radar tracking relative to this invention.
Figure 2:
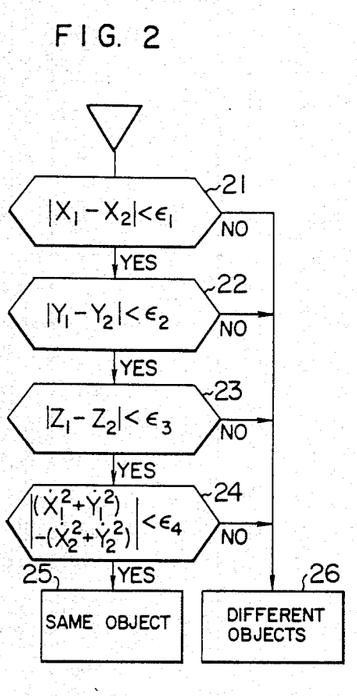
FIGS. 2 and 3 show flowcharts of target track data correlations according to the prior art systems.
Figure 3:
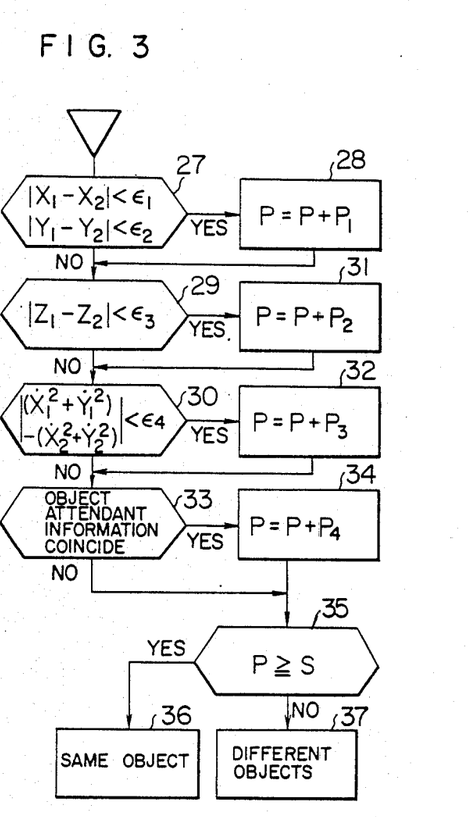

FIG. 1 shows an example of an air traffic control system as a multisensor system. Numerals 1A and 1B denote radar apparatus. 2A and 2B denote tracking apparatus which execute a tracking processing using radar observation data, and which produce the result of tracking as tracking data (punctual coordinates of a flying object: X, Y, Z; velocities: $\dot{X}$, $\dot{Y}$). 3 denotes a surveillance apparatus which executes a correlation processing for the tracking data transmitted from the radar sites and decides whether the tracking data are data on the same flying target or not. Since each tracking data has a tracking error, respectively, they may not have the same value even if they are data on the same flying target. Therefore, a correlation processing on tracking data has been made in the surveillance apparatus 3 in accordance with the processes shown in FIGS. 2 and 3. It is assumed that values of the position and velocity of the tracking data transmitted from a sensor site A are $(X_1, Y_1, Z_1)$ and $(\dot{X}_1, \dot{Y}_1)$, respectively while these values from a sensor site B are $(X_2, Y_2, Z_2)$ and $(\dot{X}_2, \dot{Y}_2)$. The system of FIG. 2 decides whether or not differences of position data in the directions of X, Y and Z coordinates, $|X_1-X_2|$, $|Y_1-Y_2|$ and $|Z_1-Z_2|$ and a velocity difference in a XY plane $|(\dot{X}_1^2+\dot{Y}_1^2)-(\dot{X}_2^2+\dot{Y}_2^2)|$ are within allowable errors $\epsilon_1$, $\epsilon_2$, $\epsilon_3$ and $\epsilon_4$ (blocks 21, 22, 23 and 24). And if all of these differences are within the allowable errors, the above two tracking data are judged as ones on the same flying target (block 25). On the other hand, the system of FIG. 3 provides a mark or score $P_1$ (block 28) when the position differences in the directions of X and Y coordinates are smaller than threshold values $\epsilon_1$ and $\epsilon_2$, respectively (block 27), scores $P_2$ and $P_3$ (blocks 31 and 32) when the height and velocity differences are smaller than the threshold values $\epsilon_3$ and $\epsilon_4$ (blocks 29 and 30) and a further score $P_4$ (block 34) when the target attendant information data coincide with each other (block 33). And, if the summed scope P is larger than a predetermined value S (block 35), the tracking data are judged as being on the same flying target (block 36).

However, these prior art systems don't take account of density distributions of parameters of target track data to be compared and therefore, cannot obtain a high success rate in the correlation processing.

SUMMARY OF THE INVENTION

An object of this invention is to provide a method and apparatus of correlating target track data with a high success rate in the correlation processing of the target track data and high speed correlation processing which are indispensable to a multisensor system.

To this end, the invention applies a likelihood ratio testing method considering the spatial density distributions of the correlating parameters of the data to a decision in correlation processing.

DESCRIPTION OF THE PREFERRED EMBODIMENTS

This invention will be explained in detail referring to the drawing. In the first place, the principle of a target track data correlation according to this invention will be explained. The target track data correlation is an application of a likelihood ratio testing.

Figure 4:
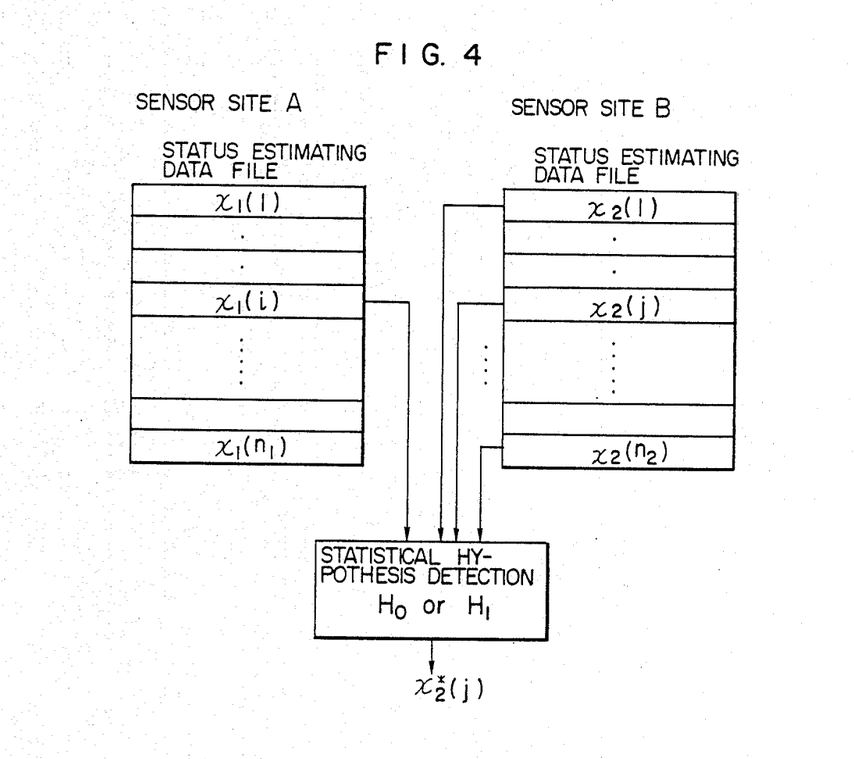
FIG. 4 shows target track data files at respective radar sites to which this invention is applied.

FIG. 4 shows target track data files at two sensor sites A and B. These data files are compared. Now, target track data $x_2(j)$, where $1 \leq j \leq n_2$, at the site B correlating to the target track data $x_1(j)$, where $1 \leq i \leq n_1$, at the site A is intended to be found out. This is a problem of statistical hypothesis detection. In this hypothesis detection, a decision is made as to which of the events $H_0$ and $H_1$ occurs. $H_0$ and $H_1$ represent events on the same target and different targets respectively. When it is assumed that $x = x_1(i) - x_2(j)$, $(i=1, \ldots n_1)$, $(j=1, \ldots n_2)$, $H_0$ and $H_1$ are represented as:

$$H_0: x = v$$

$$H_1: x = m + v$$

where $m = (m_1, \ldots m_n)$ and $v = (v_1, \ldots v_n)$. Character v represents an error vector due to estimation error and $v_i$, which are independent from each other, can be assumed to be a normal distribution having the average value of 0. Character m represents a difference vector between the respective true statuses of the different targets when $x_1(i)$ and $x_2(j)$ are target track data on the different targets, respectively. The correlation process of target hypothesis detection data is a comparison of points which are distributed in a dimensional space, therefore, the distribution of m depends on spatial distribution of multiple targets. Now it is assumed that the spatial probability density function of m is f(m). Also, since it is assumed that parameters of the target hypothesis decision data are independent from each other, assuming that the probability density function of $m_i$ is $f_i(m_i)$, $f(m)$ can be represented as a product of probability density functions as shown below.

$$f(m) = f_1(m_1) \cdot f_2(m_2) \ldots f_n(m_n) \quad \ldots (4)$$

In the comparison of points distributed in n dimensional space, that is, in correlation process of target hypothesis decision data, when the points are distributed densely, the decision of whether data are those of the same target or not is difficult. When distribution of points is sparse, it is easy to decide whether data is that of the same target or not. This is true also in the spatial density distribution of the parameters of the above described target hypothesis decision data. The parameter whose spatial density distribution is more sparse makes it easier to decide correlation as to whether data is that from the same target. This matter will be described taking the air control system as an example as follows.

Figure 5:
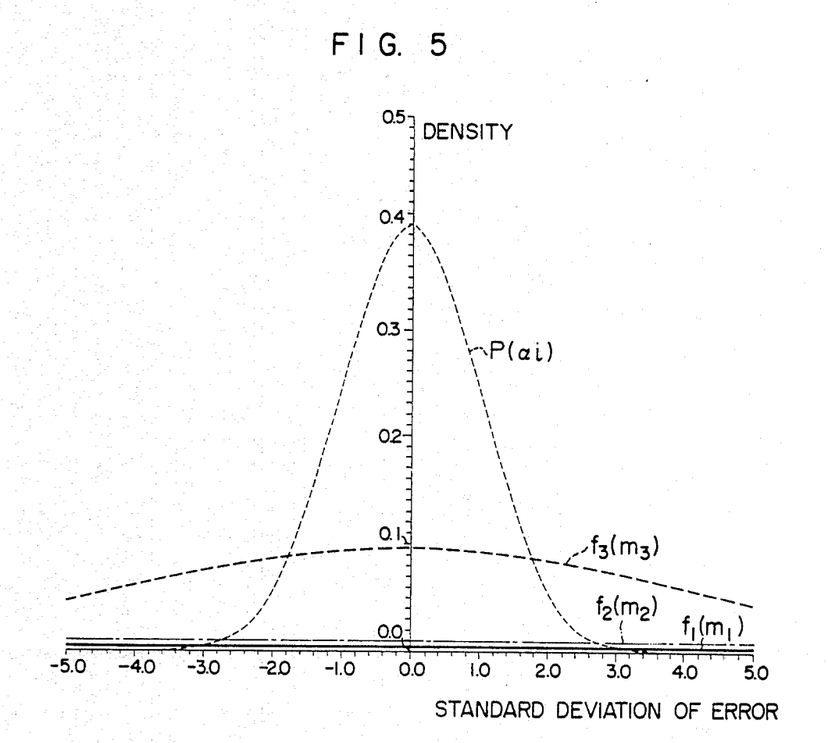
FIG. 5 shows examples of spatial density distributions of respective correlation parameters in this invention.

FIG. 5 shows the spatial probability function $f_i(m_i)$ for the distribution function $P(\alpha)$ of hypothesis decision error of the parameters. Here, the probability distribution function is normalized by the error number $\alpha_i^2 \cdot f_1(m_1)$, $f_2(m_2)$ and $f_3(m_3)$ in FIG. 5 show spatial probability density functions of three parameters, that is, difference of positions on a plane, altitude difference, and velocity difference. In the air control, although the target (object) is an aircraft, there are many cases that the velocities of aircrafts resemble with each other, therefore, the spatial distribution $f_3(m_3)$ of the velocity is more dense than distribution of other parameters, and it is difficult to determine whether data are those of the same target or not on the basis of the parameter of the velocity. Whereas, since it is rare that two aircrafts come close to each other, the spatial distributions $f_1(m_1)$ and $f_2(m_2)$ of the difference of plane positions and height difference are sparse, and these parameters make the decision as to whether the data are those of the same target or not easy.

This invention is featured in making correlation process of target hypothesis decision data taking into consideration of spatial density distribution of respective parameters, noting the above-described difference of correlation decision abilities of the parameters. Taking into consideration of $f_i(m_i)$, since it is assumed that the vector v follows the normal distribution, the thus obtained x occurs on the event $H_0$ with the probability:

$$P(x|H_0) = \frac{1}{\{(2\pi)^n det R\}^{\frac{1}{2}}} \exp\{-\tfrac{1}{2} X^T R^{-1} x\}$$

and it occurs on the event $H_1$ with the probability:

$$P(x|H_1) = \frac{1}{\{(2\pi)^n det R\}^{\frac{1}{2}}} \int_{-\infty}^{\infty} \cdots \int_{-\infty}^{\infty} \exp\{\tfrac{1}{2}(x-m)^T R^{-1}(x-m)\} \cdot f(m) dm$$

where f(m) represents a density distribution of m, and R represents a covariance matrix calculated by the equation: $R = E\{x^T x\}$. The decision of $H_0$ or $H_1$ from the vector x ($x \in H_0$ or $H_1$) is made by an ordinary likelihood ratio testing:

$$L(X) = \frac{P(x|H_1)}{P(x|H_0)} \begin{array}{c} x \in H_1 \\ > \\ < \\ x \in H_0 \end{array} \epsilon$$

However, the individual decision using the above integration needs a huge length of processing time. To obviate this defect, the likelihood ratio L(x) is approximated as the products of respective parameters $x_1$, $x_2$, ... $x_n$ of x assuming that the parameters are independent from each other:

$$L(x) = \prod_{i=1}^{n} L_i(x_i) =$$

$$\prod_{i=1}^{n} \frac{\int_{-\infty}^{\infty} \frac{1}{\sqrt{2\pi\sigma_i}} \exp\left(\frac{(x_i - m_i)^2}{2\sigma_i^2} f_i(m_i) dm_i\right)}{\frac{1}{\sqrt{2\pi\sigma_i}} \exp\left(-\frac{x_i^2}{2\sigma_i^2}\right)}$$

Figure 6:
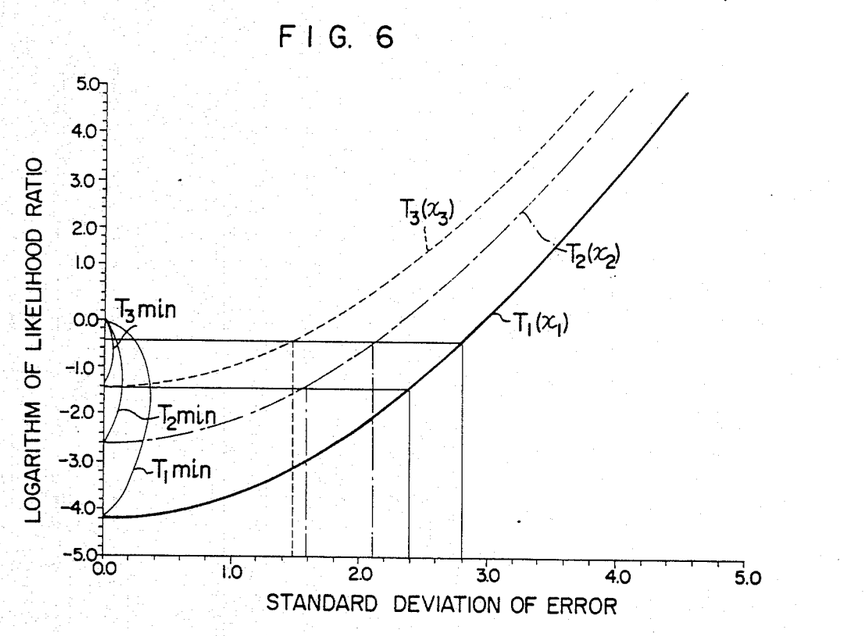
FIG. 6 shows examples of logarithms of likelihood ratios of respective correlation parameters employed in this invention.

Thus, by taking the logarithm of the likelihood ratio L(X), the likelihood ratio testing can be reduced to the following equation:

$$T(x) = \Sigma T_i(x_i) \begin{array}{c} x \in H_1 \\ > \\ < \\ x \in H_0 \end{array} C_\epsilon'$$

where $T(x) = \log L(x)$, $T_i(x_1) = \log L_i(x_i)$: When the density distribution function $f_i(m_i)$ of $x_1$ is such as shown in FIG. 5, the logarithmic likelihood ratio function $T_i(x_i)$ results as shown in FIG. 6. From this figure it can be seen that the values of the log-likelihood ratio $T_i(x_i)$ differ for every parameter. That is, with respect to the likelihood that data are those of the same target, there are differences in the correlation decision ability in each of the parameters, and it is necessary to process by weighting each of the parameters in accordance with the difference of the log-likelihood ratio. Incidentally, $P(\alpha_1)$ in FIG. 5 shows an error distribution. When the minimum value of $T_i(x_i)$ is written as $T_i^{min}$, $$T_1^{min} \leq T_2^{min} \leq T_3^{min} \leq \ldots \leq T_n^{min}$$

Thus, the logarithm of likelihood ratio T(x) is:

$$T(x) = \sum_{i=1}^{n} T_i(x_i) > T_1(x_1) + \sum_{i=2}^{n} T_i^{min}$$

Assuming that $$\epsilon(i) = C_\epsilon - \sum_{j=i+1}^{n} T_j^{min}, x \in H_1$$

if $T_1(x_1) < \epsilon(1)$. That is, by comparing only the first parameter $x_1$ of x with the reference value $\epsilon(1)$, it is possible to determine that x is an event ($x \in H_1$) of different target without carrying out decision as to other parameters. When $T_1(x_1) < \epsilon(1)$, the second parameter $x_2$ is included in an object to be compared and it is determined that $T_1(x_1) + T_2(x_2) <> \epsilon(2)$, and it is determined that $x \in H_1$ when $T_1(x_1) + T_2(x_2) < \epsilon(2)$. If x $H_1$ is not concluded, the checking of $x \in H_1$ is successively executed by the following equation:

$$\text{If } \sum_{i=1}^{L} T_i(x_i) > \epsilon(L), x \in H_1$$

Figure 7:
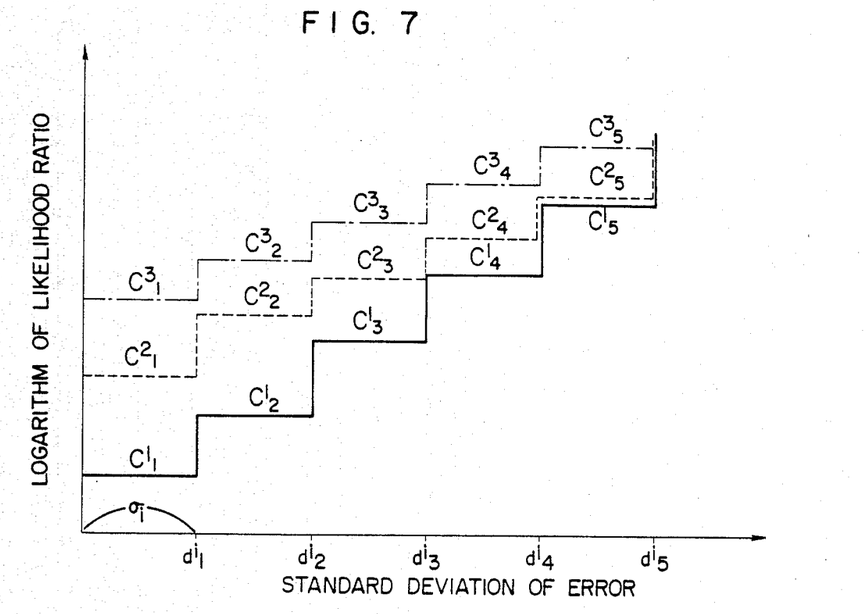
FIG. 7 shows a graph respresentative of the approximated logarithms of likelihood ratios of respective correlation parameters in this invention.

If $T(x) < C_\epsilon'$, the target track data of the sensor site B is decided to be on the same target. And if there are plural candidates to be correlated, the data having the smallest logarithm of likelihood ratio is decided to be on the same target. For the purpose of high speed decision, $T_i(x_i)$ are tabulated in advance as shown in FIG. 7 instead of executing the integration of $T_i(x_i)$. $T_i(x_i)$ is written as $$T_i(x_i) = C_j^i$$

where $d_j^i \leq |x_i| \leq d_{j+1}^i$, $j=0, \ldots$ m and $C_j^i$ is constant.

In this way, when the log-likelihood function $T_i(x_i)$ has been approximated by the constant $C_j^i$ for every parameter if $x_i$ is given, the approximation value of $T_i(x_i)$ can be obtained at once such that $T^i(x_i) = C_1^i$ if $0 < |x_i|, d_1^i$, and $T_i(x_i) = C_2^i$ if $d_1^i < |x_i| < d_2^i \ldots$ In this case, the intervals $d_1^i$, $d_2^i$, $d_3^i \ldots$ may be taken as the standard deviation $\alpha_i$. Also, as the value of $C_j^i$, the mean value of $T_i(x_i)$ in each of the sections $d_j^i$, $d_{j+1}^1$ ($j=0, 1 \ldots$ m) may be taken. When $|x_i| > 6\alpha_i$, the probability that two parameters to be compared are those of the same target become almost zero, therefore, it is possible to make $C_7^i > C_\epsilon$.

Figure 8:
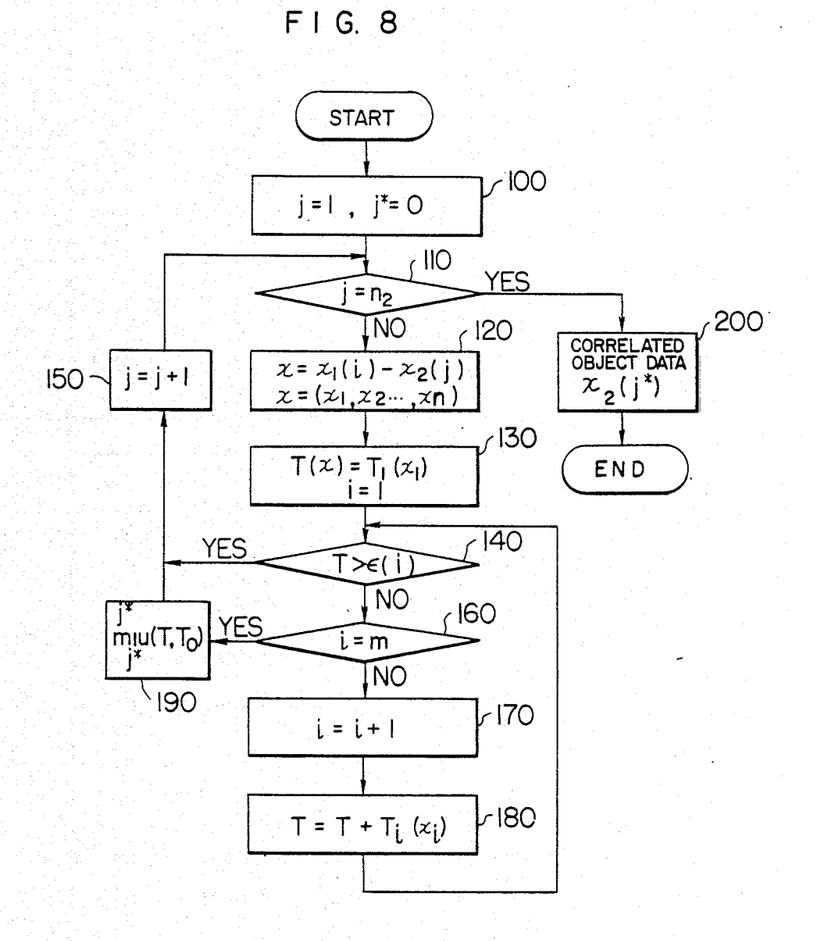
FIG. 8 shows a flowchart of one embodiment of a correlation algorithm according to this invention.

On the basis of the principle as mentioned above, the algorithm of target track data correlation can be written by the flowchart shown in FIG. 8.

In FIG. 8, in step 100, initial values are set for an index j for designating one data in a data table at a sensor site V and index j* for designating data which is determined to be one of the same target as that of $x_1(i)$. In step 110 it is decided whether or not a comparison with $x_1(i)$ has been ended for all of $n_2$ data at the sensor site B. If it has been ended, the procedure advances to step 200 and it is decided that the data $x_2(j^*)$ corresponds to $x_1(i)$. At step 120, differences with reference to each of the parameters of $s_1(i)$ and $x_2(j)$ are taken, and at step 130, a log-likelihood ratio $T_1(x_1)$ for the first parameter is obtained. This ratio $T_1(x_1)$ can be approximated by the value $C_j^i$ of the table described in FIG. 7. The value of $T_1(x_1)$ is compared with the corresponding reference value $\epsilon(1)$ in step 140. In the case of an aviation control system, since the positions of the aircraft are sufficiently distant from each other, when the data $x_2(j)$ is that of the target which is different from that of the data $x_1(i)$, almost all of the data $x_2(j)$ is determined as $x\epsilon H$, at the time of determination of step 140 with reference to the first parameter (this shows a plane position). As a result, the value of j is incremented in step 150, the procedure returns to step 110, and correlation procedure as to the next data $x_2(j)$ with $x_1(i)$ is carried out. When $T < \epsilon(1)$ in step 140, the log-likelihood ratio $T_2(x_2)$ is obtained for the next parameter, and this ratio $T_2(x_2)$ is added to $T_1(x_1)$ of the first parameter in steps 160 to 180, and the procedure returns to the step 140 and the added value is compared with $\epsilon(2)$. As long as $T < \epsilon(i)$ continues, the decision of the step 140 is repeated adding parameters in the order of weighting.

In step 160, it is determined whether the determination of the log-likelihood ratio described above has been ended for all of the m parameters for the data $x_2(j)$, and if the determination has been ended, the procedure advances to the step 190. In step 190, as a candidate of data which shows the same target, there is stored the index as j, which index is one of less value than the value $T_0$ of the log-likelihood ratio of the data which had been selected up this time and the value T of the log-likelihood ratio of data $x_2(j)$ which has become a new candidate by the decision at this time. Then, the procedure advances to the step 150.

The practical use of the correlation processing according to this invention can be made by programming the flowchart shown in FIG. 8 in the surveillance apparatus 3 of FIG. 1. Further, for the purpose of higher speed correlation, this correlation processing can be implemented in a target track data correlation apparatus as shown in FIG. 9.

Figure 9:
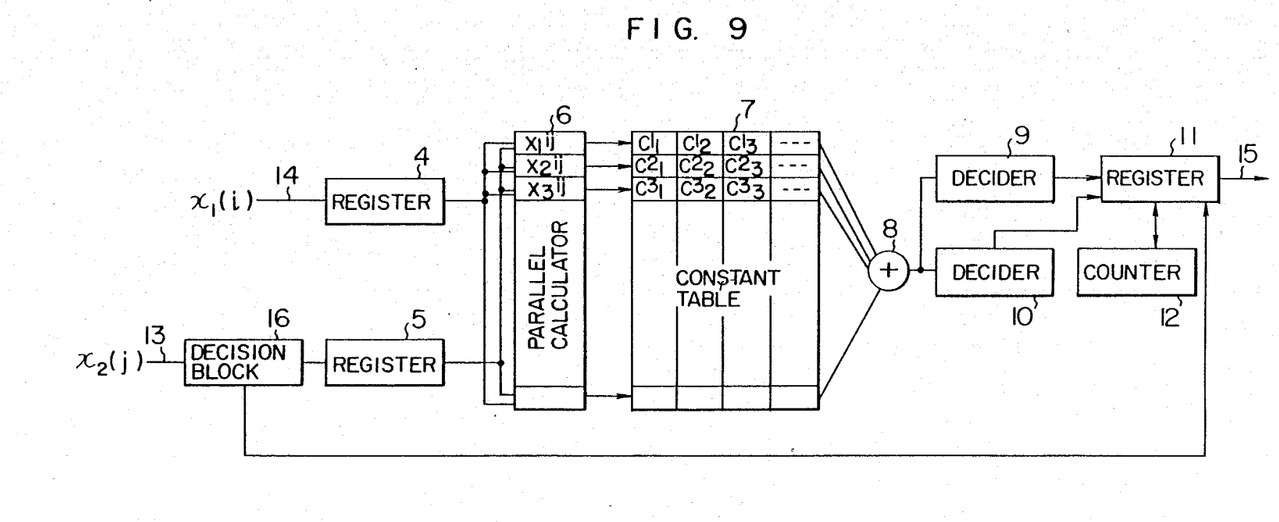
FIG. 9 shows a block diagram of one embodiment of a correlation hardware apparatus according to this invention.

In FIG. 9, a register 4 stores the data $x_1(i)$ from a line 14. It is assumed that the data $x_2(j)$ ($j=1, \ldots n_2$) are intermittently transmitted from a line 13 at a constant time interval. A final data of the successively transmitted data $x_2(j)$ is added with an end flag. A decision apparatus 16 sends the signal to a register 11 when it recognizes the end flag and sends the data except the end flag to a register 5. The data stored in the registers 4 and 5 are forwarded to n parallel calculators 6 which correspond to n parameters, and the calculators calculate $$x = x_1(i) - x_2(j), x = (x_1, \ldots x_n)$$

$$Ix_i = x_i/\sigma_i + 1$$

$Ix_i$ ($i=1, \ldots n$) are used as addresses of a constant table 7 from which approximated values $c_i$ of the logarithmic likelihood ratio function $T_i(x_i)$ for every parameter corresponding to $Ix_i$ are read out. These values are added in an adder 8 in which $T_i(x_i)$ is calculated, and supplied to deciders 9 and 10. The decider 10 comprises a comparator for comparing the value of $T(x)$ with the reference value $C_\epsilon$ and sends the signal to the register 11 when $T(x) < C_\epsilon$. A counter 12 is counted up by one count for each decision by the decider 10. The decider 9 compares the stored minimum value $T_0$ in the former correlation processing with $T(x)$ now calculated. And if $T_0 < T(x)$, the data is supplied to the register 11 in which $T(x)$ is stored as a value of the new $T_0$. Therefore, the decider 10 can be formed of a comparator and a latch circuit.

When the register 11 accepts the data from both deciders 9, 10, it receives the content of the counter 12. The received content is a correlated target track data number.

The operation as mentioned above is successively performed. And the content (the correlated target track data number) stored in the register 11 is output to a line 15 when the register 11 receives the data added with the end flag. Incidentally, it is assumed that each register is reset to zero before the correlation decision is initiated.

Thus, an explanation has been made on the hardware implementing the correlation system according to this invention.

As described above, this invention significantly improves the precision of an target track data correlation as compared with the prior art. The improvement of the target track data correlation success rate according to this invention is confirmed by a simulation although it depends on the density distribution of a target.

We claim:

1. A method of correlating target track data for deciding whether data obtained from two sensor sites are from the same target or from different targets, each of said data including a plurality of parameters, comprising the steps of:
    first step of preparing a plurality of reference values which are determined in accordance with a combination of minimum values of likelihood ratio functions for each of said parameters;
    second step of obtaining the log-likelihood ratio of numerical values obtained from said two sensor sites with reference to a pair of first parameters whose space density distribution is most sparse;
    third step of comparing the log-likelihood ratio obtained in said second step with a first reference value which is the minimum of said plurality of reference values, and determining that said data are from different targets, when the log-likelihood ratio is larger than said first reference value; and
    fourth step of accumulating the log-likelihood ratio of each of the parameter values from that of a pair of parameters whose space density parameter is sparse in order, comparing the accumulated value with the reference value selected from said plurality of reference values, said selected reference value corresponding to the number of times of said accumulation, and determining that said data are from different targets when the accumulated value exceeds the reference value;
    whereby, when the accumulated value of the log-likelihood ratio with respect to all parameters to be compared has not exceeded the reference value which has the maximum value, it is determined that said data are from the same target.

2. A method according to claim 1, further including a fifth step of approximating the log-likelihood ratio function of each parameter with a step function, said step function being dispersed such that the log-likelihood ratio has the same value for the error within a predetermined range, and preparing the approximated step function as a table, whereby the log-likelihood ratio for each of the parameters in said second step and fourth step are obtained by referring to said table.

3. A target data correlating system for searching data which designates the same target as that of a first data obtained at a first sensor site from a plurality of second data obtained at a second sensor site, each of said data including a plurality of parameters respectively, said system comprising:
    memory means for storing approximation values of the log-likelihood ratio in correspondence with a value of error for every one of said parameters, said approximation values being obtained by approximating the log-likelihood ratio function for each parameter by a step function which is dispersed such that the log-likelihood ratio has the same value for errors within a predetermined range;
    first register means for storing first data temporarily;
    second register means for storing second data to be identified with said first data in sequence;
    means for converting an error for every parameter of respective data stored in said first register means and second register means into an address with an address unit of said predetermined region and for accessing said memory means to read out a plurality of log-likelihood ratio values for every one of the parameters in parallel;
    means for adding a plurality of log-likelihood ratio read out from said memory means; and
    detection means for comparing the added value by said adding means with a predetermined reference value and for generating a signal indicative of that the data of the same target has been detected, when the added value is smaller than said reference value.

4. A target data correlating system according to claim 3, further comprising means for comparing the added value by said addition means with added values obtained previously, and detecting that data of which the added value becomes a minimum.

5. A target data correlating system according to claim 4, further including counting means for counting the number of the second data which are stored in said first register, and
    means for storing a count value of said counting means in response to output signals of said determining means and data detection means,
    whereby the position of the second data which corresponds to the first data is obtained.

6. A target data correlating method for searching data which designates the same target as that of a first data obtained at a first sensor site from a plurality of second data obtained at a second sensor site, each of said data including a plurality of parameters respectively, said method comprising the steps of:
    first step of preparing a plurality of reference values determined by combination of the minimum values of log-likelihood ratio functions, each of said functions being for each of said parameters, respectively; second step of designating data to be compared with the first data in sequence from said plurality of second data;
    third step of obtaining the log-likelihood ratio with reference to a pair of first parameters whose space density distribution is most sparse in the parameters of two data to be compared;
    fourth step of comprising the log-likelihood ratio obtained in said third step with a first reference value which has the minimum value of said plurality of reference values, determining that said two data are those from targets which are different from each other when the log-likelihood ratio is larger than the first reference value, and returning to said second step for designating the next data; and
    fifth step of accumulating the log-likelihood ratio from a pair of parameters whose space density distribution is sparse in sequence, when the log-likelihood ratio is smaller than the first reference value, comparing each accumulated value with the reference value selected from said plurality of reference values, said selected reference value corresponding to the number of times of said accumulation, and returning to said second step in order to designate the next data when the accumulated value is larger than said reference value;
    whereby when the accumulated value of the log-likelihood ratio for the all parameters to be compared does not exceed a reference value which has a maximum value, the data is determined to be one of the same target as that of said first data.

7. A target data correlating method according to claim 6, further comprising a sixth step of selecting the smaller one of the log-likelihood ratio of data, when the number of data which has been determined as that of the same target as the first data has become plural, and returning to the second step, whereby only one data in the second data is searched to be data which corresponds to the first data.

* * * * *